(12) United States Patent
Willardson et al.

(10) Patent No.: US 11,784,833 B1
(45) Date of Patent: Oct. 10, 2023

(54) APPARATUS AND METHOD FOR GENERATING AN ENDPOINT PATH ASSOCIATED WITH A USER

(71) Applicant: Gravystack, Inc., Phoenix, AZ (US)

(72) Inventors: Chad Willardson, Phoenix, AZ (US); Scott Donnell, Phoenix, AZ (US); Travis Adams, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/873,011

(22) Filed: Jul. 25, 2022

(51) Int. Cl.
  *H04L 9/32* (2006.01)
  *G06N 20/00* (2019.01)

(52) U.S. Cl.
  CPC .......... *H04L 9/3268* (2013.01); *G06N 20/00* (2019.01); *H04L 9/3213* (2013.01)

(58) Field of Classification Search
  CPC ...... H04L 9/3268; H04L 9/3213; G06N 20/00
  See application file for complete search history.

(56) References Cited

U.S. PATENT DOCUMENTS

| | | | |
|---|---|---|---|
| 10,339,550 B2* | 7/2019 | Rao | G06Q 10/103 |
| 10,847,266 B1* | 11/2020 | Ross | G06Q 50/01 |
| 2011/0035680 A1* | 2/2011 | Borovoy | G06Q 10/06398 715/751 |
| 2011/0223570 A1* | 9/2011 | Bellontine | A63F 3/0478 434/236 |
| 2014/0164037 A1* | 6/2014 | Rao | G06Q 30/0207 705/7.13 |
| 2017/0372227 A1* | 12/2017 | Hosabettu | G06N 5/025 |
| 2018/0165604 A1* | 6/2018 | Minkin | G06Q 10/06 |
| 2018/0239959 A1* | 8/2018 | Bui | G06Q 10/10 |
| 2018/0329738 A1* | 11/2018 | Kasha | G06F 8/71 |
| 2019/0009133 A1* | 1/2019 | Mettler May | G09B 19/0038 |
| 2019/0370026 A1* | 12/2019 | Schutzman | G06Q 40/00 |
| 2020/0402311 A1* | 12/2020 | Trim | G06Q 30/02 |
| 2021/0390951 A1* | 12/2021 | Gadde | G06F 40/30 |

* cited by examiner

*Primary Examiner* — J. Brant Murphy
(74) *Attorney, Agent, or Firm* — CALDWELL INTELLECTUAL PROPERTY LAW

(57) ABSTRACT

The invention is directed towards an apparatus and method for generating an endpoint path associated with a user. A processor is configured to receiver user data relating to an action datum. The processor is configured to select an endpoint. The endpoint is then used to generate an endpoint path where a user's skills are taken into account. Once the user completes an endpoint, a token certificate is generated.

20 Claims, 8 Drawing Sheets

APPARATUS AND METHOD FOR GENERATING AN ENDPOINT PATH ASSOCIATED WITH A USER

FIELD OF THE INVENTION

The present invention generally relates to the field of cryptography. In particular, the present invention is directed to generating an endpoint path associated with a user.

BACKGROUND

It is difficult to reach an endpoint using a path that is generic for every user. There is a need for a way to generate an endpoint path that is unique to each user.

SUMMARY OF THE DISCLOSURE

In an aspect an apparatus for generating an endpoint path associated with a user includes at least a processor, and a memory connected to the at least a processor, the memory containing instructions configuring the at least a processor to generate an endpoint path, receive user data, transmit the endpoint path to a user and generate a token certificate as a function of a completed endpoint.

In another aspect a method for generating an endpoint path associated with a user includes generating an endpoint path, receiving user, transmitting the endpoint path to a user, and generating a token certificate as a function of the completed endpoint.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
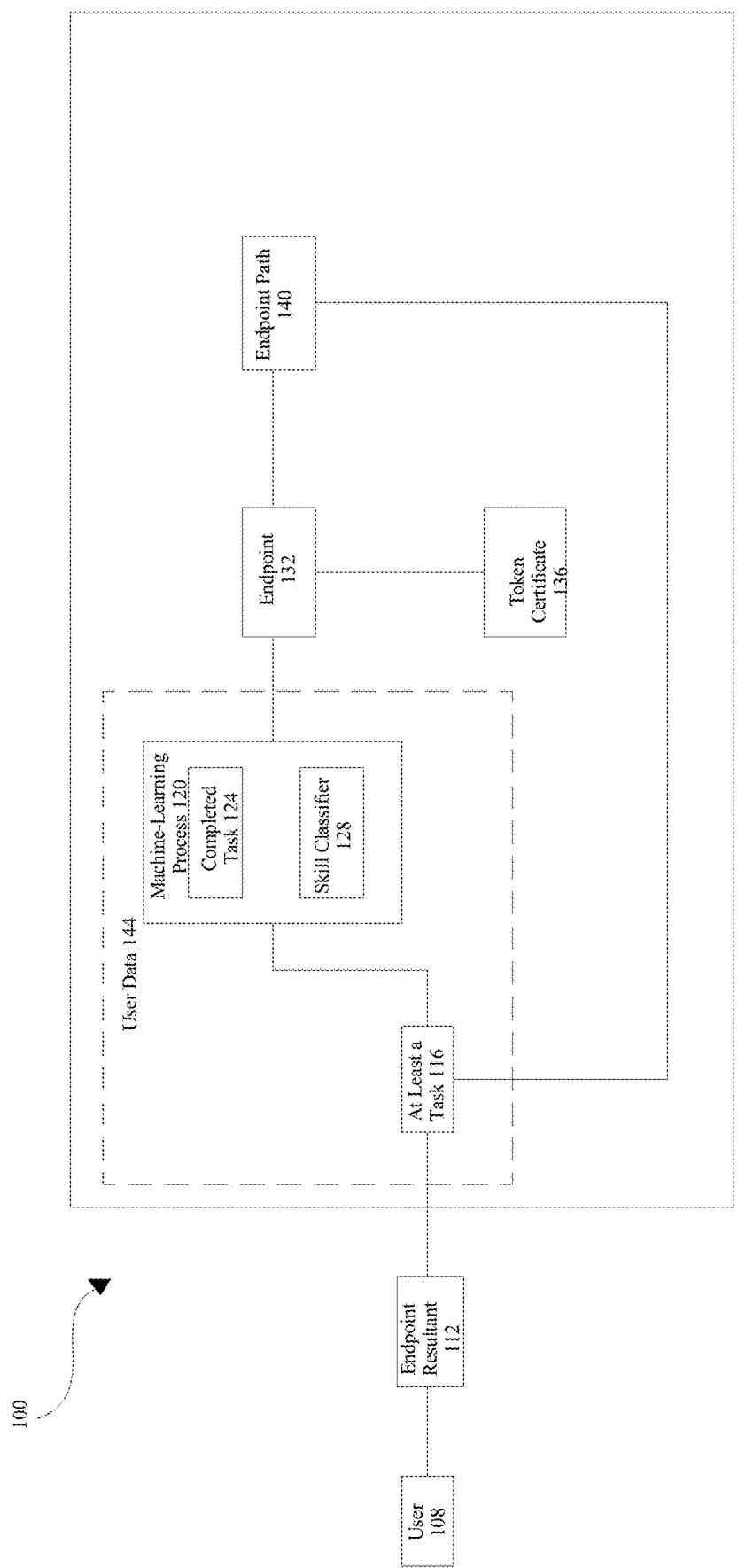
FIG. 1 is a block diagram illustrating generating an endpoint path associated with a user.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an endpoint path associated with a user. In an embodiment, a memory nay be communicatively connected to a processor. The memory contains instructions configuring the processor to generate an endpoint path relating to a user. The endpoint may be related to a task that the user has completed. An endpoint path may be generated as a function of at least an endpoint and other user data 144.

Aspects of the present disclosure can be used to generate a generic endpoint path for users. This is so, at least in part, because the same methods applied for unique endpoint paths can be broaden for generic endpoint paths. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus for generating an endpoint path associated with a user is illustrated. System includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting a computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referencing FIG. 1, user 108 may designate an endpoint resultant 112. A "user," as used herein, refers to an operator of a computer or network service. The term "task" refers to a piece of work to be done or undertaken. For instance, a user may be a child with an interest in learning more about algebra. A useful task for the user to engage with would be basic level algebra problems. The term "endpoint resultant" as used herein, refers to the projected goal or task that the user wants to complete. In a non-limiting embodiment, the endpoint resultant may be a broad goal, such as to become competent in mathematics or conversationally fluent in Spanish. The endpoint resultant may be chosen by user 108. User 108 may engage with at least a task 116. The phrase "at least a task," as used herein, means at least one task is involved but there could be multiple tasks involved as well. User 108 has user data 144 that may comprise of at least a task 116. The term "user data 144," as used herein, refers to information relevant to the user, such as any completed task 124. A "completed task" is a task that a user has finished. For instance, user data 144 may be a compilation of all completed tasks, such as completed quizzes that pertain to algebra. The user data 144 can be used to provide evidence of mastery of a subject, or user data 144 may be used to show where strengths and/or deficiencies lie within the subject. Completed tasks 120 may provide machine learning process 120 with information regarding the skills user 108 may have engaged with during at least a task 116. A "skill" as used herein refers to the potential ability to do something well, possibly at an expertise level. User 108 may choose the skill they want to learn which may in turn allow processor 104 to generate at least a task 116 that may allow user 108 to develop that skill. Skill determination and/or selection may be performed, without limitation as described in U.S. Nonprovisional application Ser. No. 17/872,857, filed on Jul. 25, 2022, entitled "APPARATUS AND METHODS FOR ANALYZING STRENGTHS," the entirety of which is incorporated herein by reference, U.S. Nonprovisional application Ser. No. 17/872,950, filed on Jul. 25, 2022, entitled "APPARATUS AND METHODS FOR ANALYZING DEFICIENCIES," the entirety of which is incorporated herein by reference, and/or U.S. Nonprovisional application Ser. No. 17/872,910, filed on Jul. 25, 2022, entitled "APPARATUS FOR ATTRIBUTE PATH GENERATION," the entirety of which is incorporated herein by reference.

Continuing reference to FIG. 1, user data 144 may be used within machine learning process 120. Processor 104 may perform determinations, classification, and/or analysis steps, methods, processes, or the like as described in this disclosure using machine learning process 120. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Machine-learning process 120 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. Within machine learning process 120 there may be skill classifier 128. A "classifier," as used in this disclosure is a machine-learning model, such as a mathematical model, neural net, or program generated by a machine learning algorithm known as a "classification algorithm" that sorts inputs into categories or bins of data, outputting the categories or bins of data and/or labels associated therewith. A classifier may be configured to output at least a datum that labels or otherwise identifies a set of data that are clustered together, found to be close under a distance metric, or the like. A skill classifier may use user data 144 to group data. There may be at least strength data and deficiency data contained within information gained from user data 144. User data 144 may include deficiencies relevant to an objective. For example, the user data 144 may include examples such as a deficiency for a user 108 that wants to learn algebra but it struggling to isolate a necessary variable within the function. Skill classifier 128 may be able to identify the weakness and generate a path to work on this deficiency. A user 108 may have a plurality of skills, but machine-learning process 120 may only identify skills relevant to completed task 124. Alternatively, machine-learning process 120 may identify all skills associated with user data 144. Inputs to the machine-learning model may include completed task 124, skill classifier 128 and the like. An "input," as used herein, refers to data that is put into a process or system. An example of an input is text that is typed into a computer. The user is entering information into the computer's processor by inputting typed words into a search engine. Machine learning process 120 may be iterative such that outputs of the classification algorithm may be used as future inputs of the algorithm. This may allow the skill classifier 128 to evolve. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Further referencing FIG. 1, outputs to machine-learning process 120 may include an endpoint 132. An "output" as used herein, refers to the product of the machine learning process. Completed task 124 and other user data 144 may be inputted into machine learning process 120, and endpoint 132 may be the output. The term "endpoint," as used herein, refers to a goal of a user. An endpoint may be a predetermined goal or a personalized goal that user 108 wants to achieve. For instance, if a user wants to become better at mathematics, their endpoint could be to master the topic of algebra. Tasks that the processor generates for the user may comprise of various mathematics quizzes and fact patterns. After these tasks are completed, the completed tasks may move through the machine learning process and skill classifier, to produce an endpoint that the user can engage with. Processor 104 may utilize a knowledge-based system (KBS) to classify a user data 144 set to at least a task 116. As used in this disclosure, a KBS is a computer program that reasons and uses a knowledge base to solve complex problems. A KBS may scrape websites to gain knowledge for the knowledge base. As used herein, a "knowledge base" is an established collection of information and resources. The KBS has two distinguishing features: a knowledge base and an inference engine. A knowledge base may include technology used to store complex structured and unstructured information used by a computer system, often in some form of subsumption ontology rather than implicitly embedded in procedural code. Other common approaches in addition to a subsumption ontology include frames, conceptual graphs, and logical assertions. In some embodiments, the knowledge base may be a storage hub that contains information about past matches of user data 144 to at least a task 116 or endpoint 132 based on the similarity of inputs and feedback from users and system administrators about the compatibility of matches. Next, an inference engine allows new knowledge to be inferred. For example, the inference engine may determine that a user's system has user data 144 with attributes that demonstrate a deficiency of math skills, the system may then infer that the user 108 should take additional courses in algebra. In another example, the inference engine may infer a strength based on the user data 144. Inferences can take the form of IF-THEN rules coupled with forward chaining or backward chaining approaches. Forward chaining starts with the known facts and asserts new facts. Backward chaining starts with goals and works backward to determine what facts must be asserted so that the goals can be achieved. Other approaches include the use of automated theorem provers, logic programming, blackboard systems, and term rewriting systems such as CHR (Constraint Handling Rules). For example, following the IF-THEN rule format, the inference engine could devise "if user data 144 consists of an aptitude for musical talent, then an endpoint may include a proposed task of learning how to play a musical instrument." The inference engine may make predictions or decisions in optimizing user data 144 to endpoint 132 for a user without being explicitly programmed to do so. The inference engine may receive constant feedback and self-learn based on previous classifications, as described through this disclosure, and recommendations to further refine and strengthen its recommendations.

Continuing to reference FIG. 1, machine learning process 120 may further include a scoring function to determine an endpoint 132. In any embodiment, a user data 144 set may be scored to determine the skills of the user 108. For example, a completed task 124 may be scored with a numerical integer between 1-10, wherein 10 means that there are no deficiencies in the user's habits and 1 is total deficiency in the user's habits. In another embodiment, the scoring may be determined by survey data. For example, if a user 108 gets a question on the survey correct, it may add points. The score may also be generated by self-ranking, which may be present in survey user data 144, such that a user may rank themselves for their level of understanding for a particular question. For example, a user may be asked to identify their strength in musical rhythm as a rank between 1-10, 1 being the worst, and 10 being the best. In an embodiment, there may be a threshold score set by a user of apparatus 100, or by processor 104. A threshold score may be used to determine whether there are skills in the data set. For example, if the threshold score is set at 7, any completed task 124 that score below a 7 may include deficiencies. Fuzzy set classification may also be used. A "fuzzy set" is a class of objects with a continuum of grades of membership. Such a set is characterized by a membership (characteristic) function which assigned to each object a grade of membership ranging between zero and one. Membership may include characteristics associated with user data 144, such as strength or deficiency in understanding a completed task or applied skill.

Continuing to reference FIG. 1, in a non-limiting embodiment, a scoring function used to determine an endpoint 132 may also be determined using a supervised machine-learning model. The supervised machine learning model may be trained using data indicating performance of similar tasks by people generally, and/or by people belonging to a population matching user data to indicate a possible endpoint 132 for user to engage with. A population matching user data may be determined through the user of a classifier. The classifier may utilize data pertaining to inputs including user data, population data, and the like to match or classify population data to user data based on similarities found throughout the classification process. If members of the population have similar goals, proficiencies, deficiencies, and the like to a user, this may classify the members of the population as viable candidates for training data for the supervised machine-learning process.

Continuing reference to FIG. 1, in a non-limiting embodiment, the scoring function may use algorithmic and/or aggregative processes to determine endpoint 132. Scoring function may calculate one or more component scores and aggregate them determine endpoint 132. Aggregation could be performed using a weighted sum where the weights are determined by machine-learning against a general population and/or population of similar users. Aggregation may alternatively or additionally be performed by entering component scores as inputs into an aggregation machine-learning model that may output a final score which can be used to determine endpoint 132. In a non-limiting embodiment, component scores may be indicative of timeliness, ratings by one or more peers, rating by an "inner circle" member, degree of completion, relevance to a current objective or goal of the user, inventive thought processes used, clarity, presentation, organization, and the like. The degree of relevance to a current objective or goal of the user may be computed using a machine-learning process with training data pertaining to degrees of relevance associated with similar objectives or goals completed by the user, general population, and/or population of matching user data. In a non-limiting embodiment, the component scores may be computed using a machine-learning process. A component score machine-learning process may be trained using data indicating component scores of similar tasks by the user, general population, and/or a population matching user data to indicate the degree of completion that the user has accomplished.

With reference to FIG. 1, in an embodiment, processor 104 may validate completion of an endpoint and/or task. In a non-limiting embodiment, processor 104 may use crowdsourcing to validate completion of an endpoint or task. In an embodiment, the user may upload proof of their completed endpoint or task to processor 104, where other users may be able to either validate that the endpoint or task has been completed correctly or the other users may decide that the endpoint or task was not completed fully and return it back to the original user who completed the task or endpoint. Tasks and endpoints also may be validated by authoritative figures, such as parents, teachers, tutors, guardians, and the like. Task and endpoints may be validated by at least one other user or the like. In an embodiment, users who perform validation on tasks and endpoints may have some level of expertise in the field of the task or endpoint, users who perform validation may also have completed a similar endpoint or task. Additional disclosure related endpoint or task validation may be found in U.S. patent application Ser. No. 17/872,847, filed on Jul. 25, 2022, and entitled "APPARATUS AND METHOD FOR GENERATING AN ACTION VALIDATION PROTOCOL," the entirety of which is incorporated herein by reference.

With continued reference to FIG. 1, in an embodiment, processor 104 may validate a user's identity. An inquiry datum may generate a series of answers to questions asked by the user to help task completion. In a non-limiting embodiment, processor 104 may generate a verified external datum to validate the authenticity of a user's identity. A verified external datum may use a verification protocol such as biometric identifier, multi-factor authentication, verification machine learning models, token-based authentication, and the like. Verification may confirm a user's identity, confirm that a task was completed by a specific user, confirm a validator's identity and the like. Additional disclosure related to user verification may be found in U.S. patent application Ser. No. 17/872,136, filed on Jul. 25, 2022, and entitled "AN APPARATUS FOR EXTERNAL ACTIVITY VERIFICATION AND A METHOD FOR ITS USE," the entirety of which is incorporated herein by reference.

Continuing to reference FIG. 1, processor 104 may generate an endpoint path 140 as a function of endpoint 132. As used herein, an "endpoint path" are a step/steps for a user to take to accomplish and/or surpass goals associated with a user's completed tasks. A step may be an action such as completing an endpoint, or the like. An endpoint path 140 may be used to for a user 108 to improve their skills. In an embodiment, machine-learning process 120, using skill classifier 128, may be used to generate an endpoint path 138. For example, completed task 124 may be used as an input in skill classifier 128. Machine-learning models are discussed in further detail below. A KBS, as discussed above, may also be used to determine an endpoint path 126. Skill classifier 128 may perform classification in any way as discussed herein. Machine-learning process 120 may be trained using training data that includes previous input-output combinations from the model, various skills, various endpoint paths, various tasks, and the like. Training data may be gathered through previous iterations of the machine-learning process. Skill classifier 128 may output an endpoint path 140 based on endpoint 132 and completed task 124 extracted from the user data 144. For example, if a user's deficiency is project management and the task is to start a business, an endpoint path 140 may include going to business school. For example, a user may submit a credit score record as the behavioral data set 108. A machine learning process 120 may identify "credit" as the completed task 124 and determine an endpoint path 140 of "paying off loans" if the task is to "get a mortgage. The machine learning process 120 may be iterative and update training data to improve outputs.

Still referring to FIG. 1, processor 104 may be configured to generate a classifier, such as skill classifier 128, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayed Theorem expressed as P(A/B)=P(B/A), P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Further referencing FIG. 1, processor 104 may be configured to categorize a plurality of users who have matching skills, tasks, endpoints, endpoint paths, etc. A "plurality of users" may comprise of at least one user who engages with the platform. Endpoint path may be transmitted to user 108 using a transmission protocol. The term "transmitted" as used herein, refers to the process of passing information from one source to another. For instance, endpoint path 140 may be transmitted to user 108 through an emailed notification or mobile phone alert. Once user 108 engages with endpoint 132, they may receive an email or text notification that another endpoint 132 from endpoint path 140 has been transmitted to their account for viewing. The term "transmission protocol" as used herein, refers to the process by which the endpoint path 140 is received from the user 108. Transmission protocol may require that a user provides their signature affirming that the action datum waypoint was completed to the best of their ability and the user did not obtain assistance from any third-party sources. A "third party source" as used herein, refers to any user or party that is not the user. Transmission protocol may also require that the user provides photographic evidence that they are the only users who are viewing and completing the at least a task 116 or endpoint 132.

Further referencing FIG. 1, completion of an endpoint 132 may generate a token certificate 136. As used in this disclosure, a "token certificate" is a unique and non-interchangeable unit of data stored on a ledge representing ownership of an asset and/or a financial interest. As used in this disclosure, a "ledger" is a digital immutable ledger where data entries may be posted and cannot be altered. According, token certificate 136 may prove ownership of an asset. An asset may include an achievement, physical artwork, digital artwork, music, in-game items, videos, photographs, real estate, and the like. In an embodiment, token certificate 136 may be a virtual embodiment of an achieved objective and/or completed task. A token certificate 136 may be stored on an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement a ledger, where data entries that have been posted to the immutable sequential listing cannot be altered. An immutable sequential listing may include a directed acyclic graph. Ledger may be distributed across some or all nodes on a network, such as a peer-to-peer network, whereby each node replicates and saves an identical copy of the ledger and updates itself independently. A common example of an immutable sequential listing is a blockchain. Immutable sequential listing may include multiple immutable sequential listings. Immutable sequential listing may include shared and synchronized digital data which may be spread across multiple sites. Immutable sequential listing may be stored and/or implemented on two or more nodes that may be connected by a network, such as on a peer-to-peer network. A node may include a device such as processor 104, any remote device, or the like. Nodes may be connected by a network and share information through a ledger that is distributed. There may be no central administrator or centralized data storage of information and/or data located on immutable sequential listing. As information is entered onto and updated on ledger shared by nodes on a network, each node may construct a new transaction. Nodes may then vote by a consensus algorithm as to which copy is correct. Consensus algorithms may include proof of work, proof of stake, or voting systems. Once a consensus has been determined, all other nodes may update themselves to reflect the new copy of the ledger. In some embodiments, nodes may copy ledger in its entirety. In other embodiments, nodes may copy one or more portions of ledger. Nodes may be connected through a peer-to-peer networking whereby nodes are equally privileged and equipotent participants. A peer-to-peer network may include a network of nodes that may make a portion of their resources available to other network participants. This may include resources such as processing power, disk storage or network bandwidth. Nodes located on a peer-to-peer network may both supply and consume resources. Apparatus 100 may utilize cryptographic keys and digital signatures to ensure node security and/or authenticity.

Continuing to reference FIG. 1, token certificate 136 may include information of the asset, such as a unique fingerprint of the asset file, a token name, a token symbol, and/or a link to a file posted on an interplanetary file system ("IPFS"). Processor 104 may be configured to generate token certificate 136. Token certificate 136 may be included in a ledger as part of immutable sequence listing. Token certificate 136 may include a plurality of token certificates. Token certificate 136 may be accessible at any of various security settings; for instance, and without limitation, token certificate 136 may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Token certificate 136 may exist in more than one level, including, without limitation, a first access level or community of permitted entities and/or devices having ability to read, and a second access level or community of permitted entities and/or devices having ability to write; first and second community may be overlapping or non-overlapping. Processor 104 may be configured to record in immutable sequence listing various events such as a creation of token certificate 136, an initial acquisition of the token certificate 136, any sales and/or resales of shares of token certificates, tickets based on token certificates, or the like, including without limitation the identity of the seller and purchaser, the purchase price, and/or a timestamp of the transaction.

Continuing to reference FIG. 1, token certificate 136 may be associated with a user 108. User 108 may own token certificate 136 upon completion of endpoint 132. A user may provide information such as their name, email, phone number, username, and/or other personal identifying information may be associated with token certificate 136. User 108 information may be posted on an immutable sequential listing. User 108 information may be retrieved and used to generate the token certificate 136. For example, the user 108 information may be linked with the endpoint 132 and when the endpoint 132 is complete, the token certificate 136 is generated and linked to the user 108. In an embodiment, the token certificate 136 and the associated owner, which may be user 108, may be shared and visible to other people with access to the immutable sequential listing. In an embodiment, apparatus 100 may allow people, such as employers, or the like, to view accomplishments/assignments completed by a user and verified by a third party and/or processor 104. A token certificate 136 may be shared through a network, such as a wireless network. A token certificate 136 may be shared through a link, such as a URL link.

Figure 2:
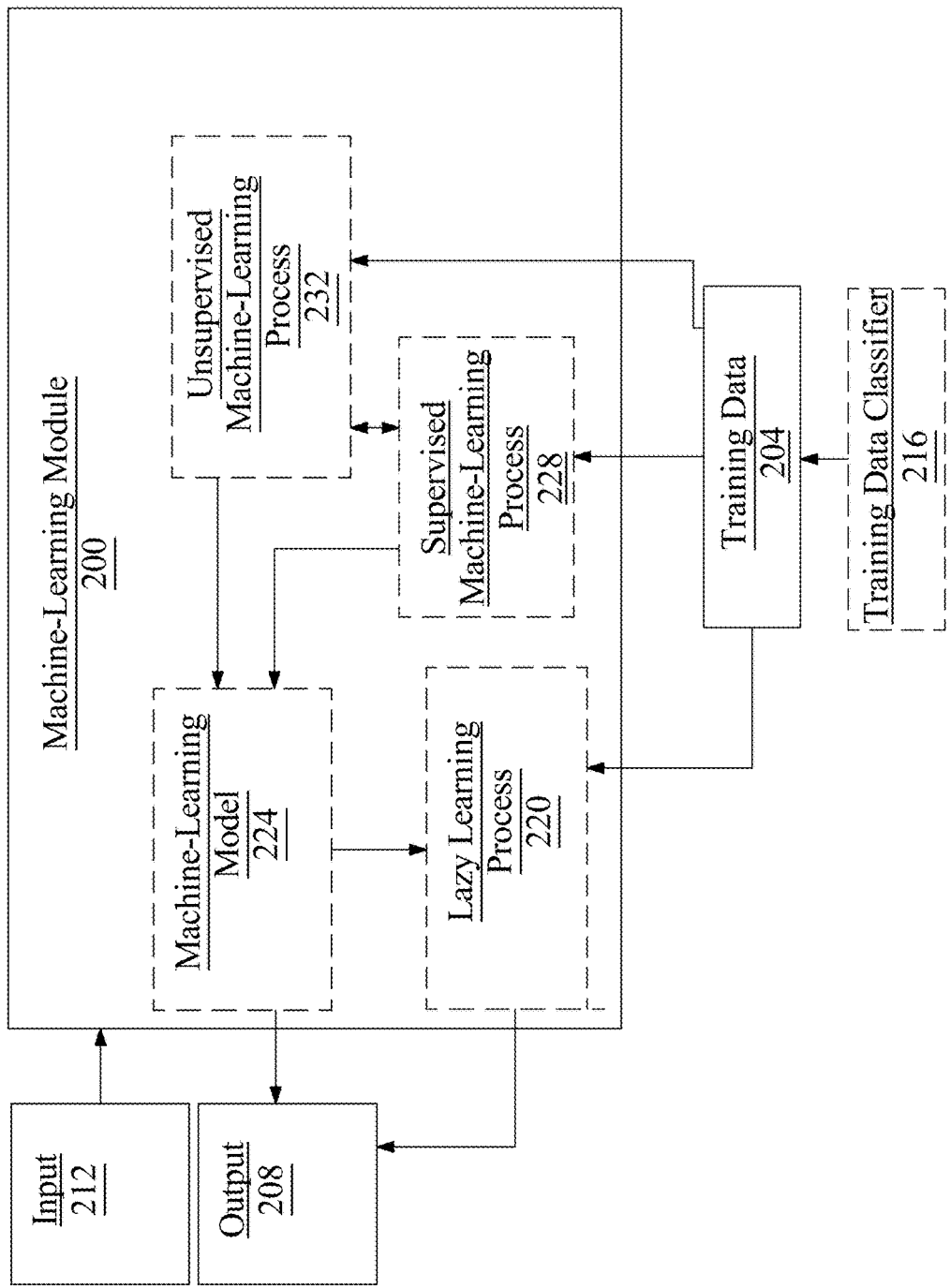
FIG. 2 a block diagram illustrating an exemplary model of a machine learning process.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input 212 data as described in this disclosure to any output 208 data as described in this disclosure.

Further referring to FIG. 2, training data 204 may be filtered, sorted, and/or selected using one or more supervised and/or unsupervised machine-learning processes 222 and/or models as described in further detail below; such models may include without limitation a training data classifier 216. Training data classifier 216 may include a "classifier," which as used in this disclosure is a machine-learning model 224 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output 208 at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process and/or protocol, which may alternatively be referred to as a "lazy loading" or "call-when-needed" process and/or protocol, may be a process whereby machine learning is conducted upon receipt of an input 212 to be converted to an output 208, by combining the input 212 and training set to derive the algorithm to be used to produce the output 208 on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning 220 may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above and stored in memory; an input 212 is submitted to a machine-learning model 224 once created, which generates an output 208 based on the relationship that was derived. For instance, and without limitation, a linear regression model, generated using a linear regression algorithm, may compute a linear combination of input 212 data using coefficients derived during machine-learning processes to calculate an output datum. As a further non-limiting example, a machine-learning model may be generated by creating an artificial neural network, such as a convolutional neural network comprising an input 212 layer of nodes, one or more intermediate layers, and an output 208 layer of nodes. Connections between nodes may be created via the process of "training" the network, in which elements from a training data 804 set are applied to the input 212 nodes, a suitable training algorithm (such as Levenberg-Marquardt, conjugate gradient, simulated annealing, or other algorithms) is then used to adjust the connections and weights between nodes in adjacent layers of the neural network to produce the desired values at the output 208 nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process 232, as used herein, is a process that derives inferences in datasets without regard to labels; as a result, an unsupervised machine-learning process 232 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
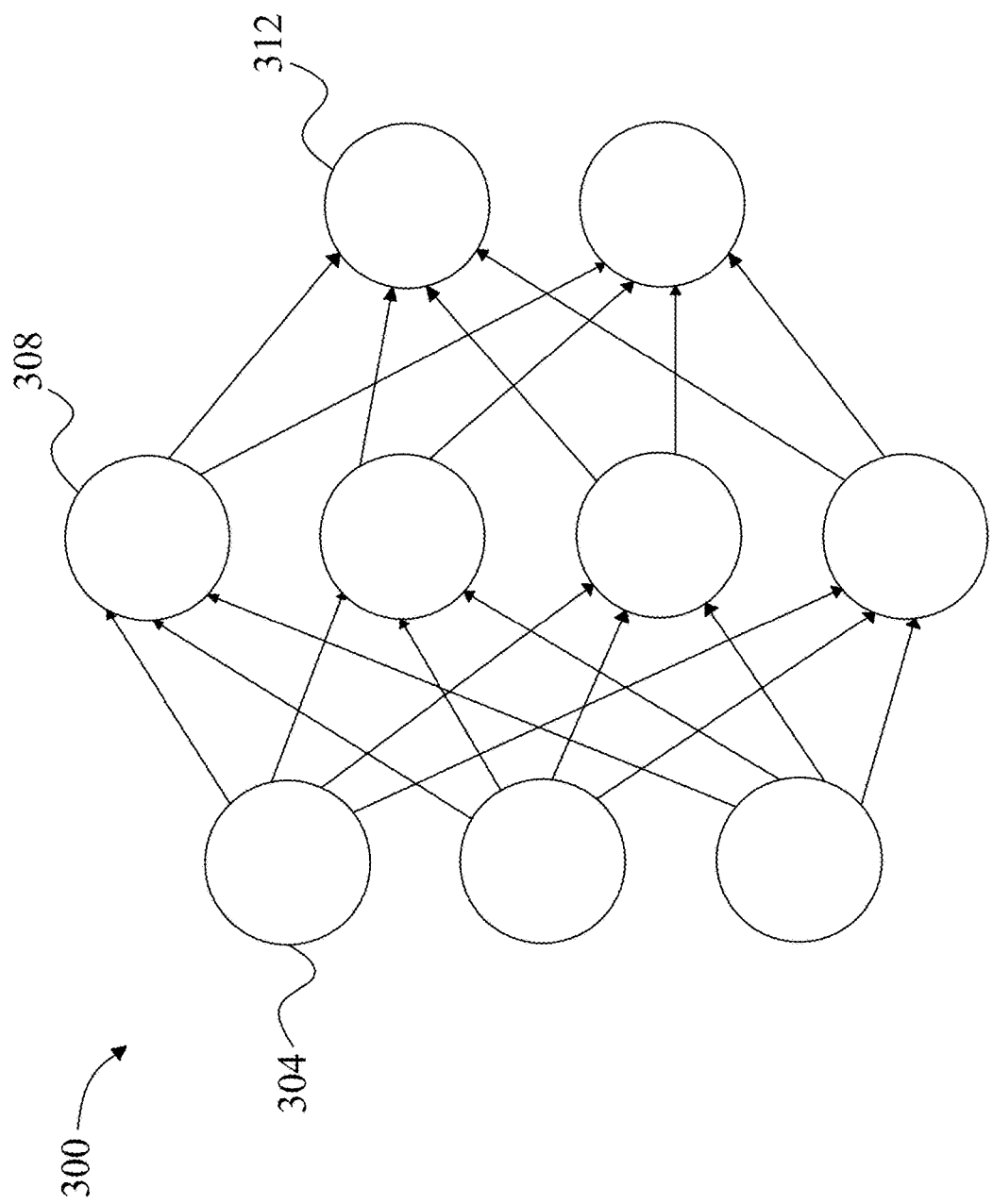
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
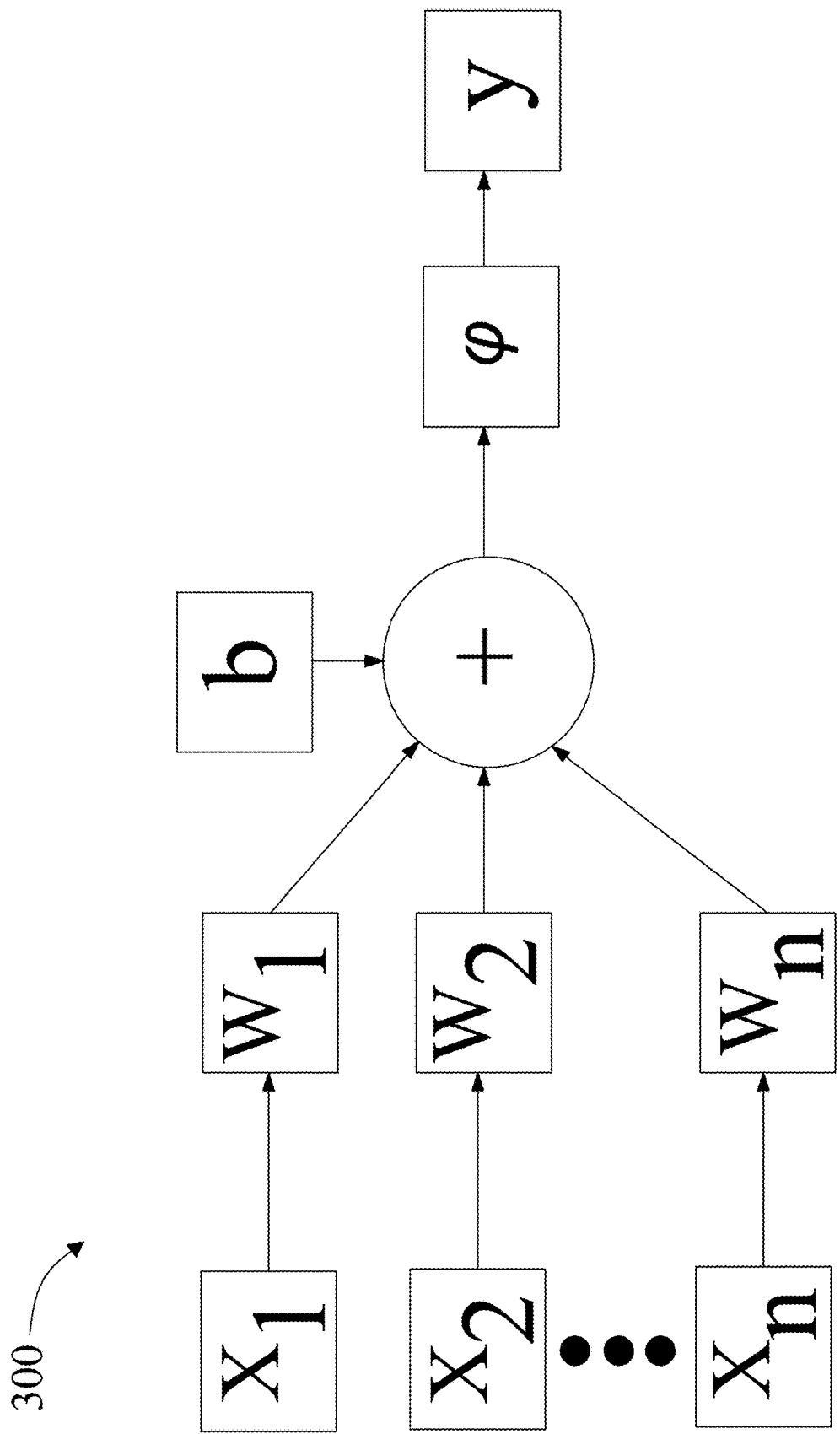
FIG. 4 is a diagram of an exemplary embodiment of a node of a neural network.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
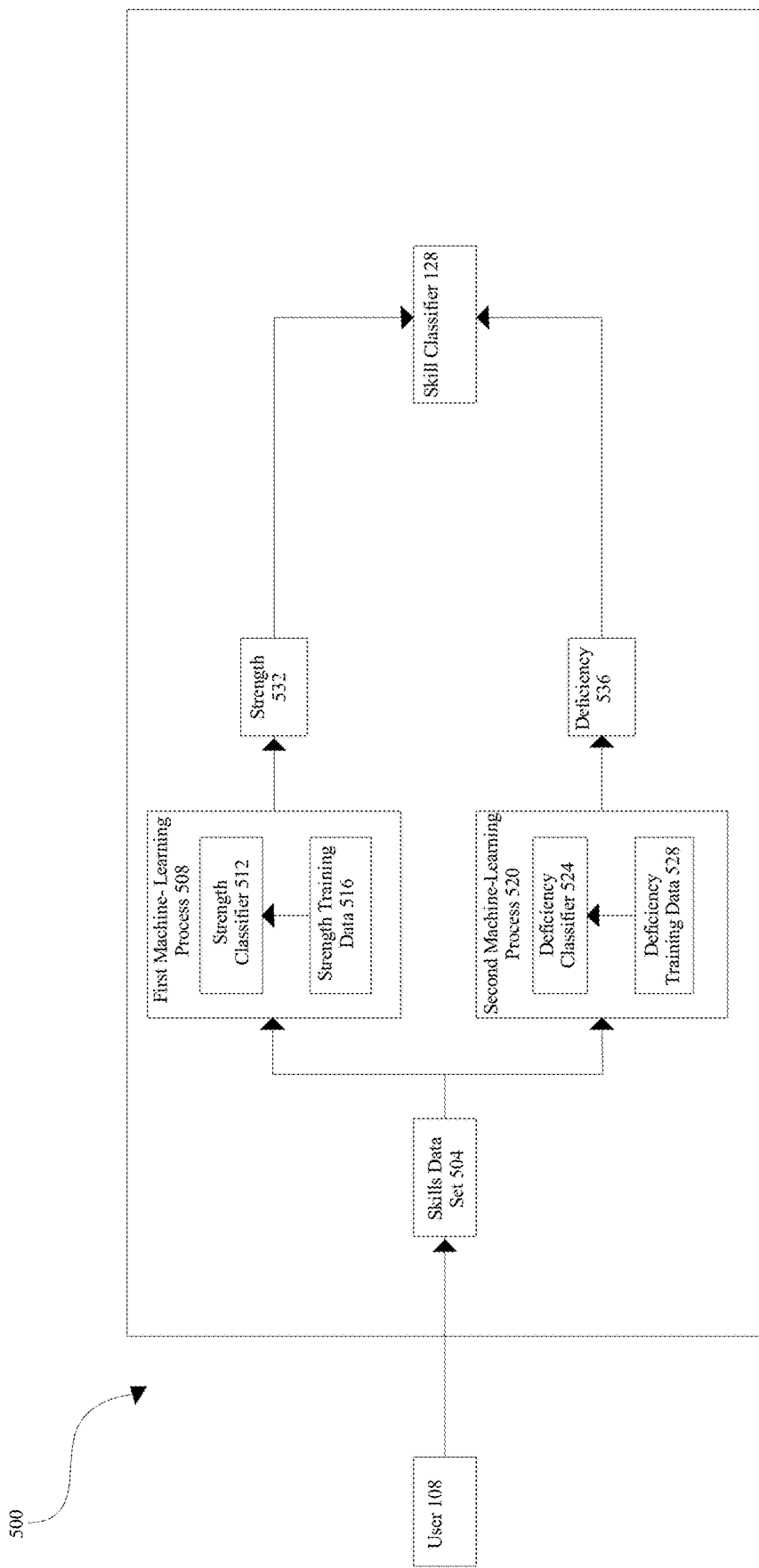
FIG. 5 is a flow diagram illustrating a skill data set classification process.

Continuing reference to FIG. 5, processor 104 is configured to receive user data 144 related to a user 108. Within user data 144, there may be a skills data set 504. A "skills data set", as used herein, is a data relating to a user's abilities. An "ability", as used herein, is a user's proficiency in something. A user's abilities may refer to educational abilities, vocational abilities, pecuniary abilities, musical abilities, strength abilities, or the like. Strength abilities may include VO5 max, running times, running speed, weightlifting abilities, and the like. The skills data set 504 may be inputted by a user. The skills data set 504 may be collected through a survey, as described below. A skills data set 504 may include audiovisual data. "Audiovisual data" is information stored with sight and/or sound. Audiovisual data may include text, voice memos, videos, photos, or the like. A skills data set may demonstrate a user's skills and/or abilities. In an embodiment, the skills data set 504 may include a document documenting a user's strength abilities in deadlifting, squatting, and benching. In another embodiment, the skills data set 504 may include a recording of a piece of music by the user 108. In another embodiment, the skills data set 504 may include a budgeting spreadsheet of the user's finances.

Continuing to reference FIG. 5, the skills data set 504 may include behavioral patterns of a user 108. As used in this disclosure, "behavioral patterns" is data relating to a user's behaviors. As used herein, "behaviors" are habits of the user in any aspect of the user's life. In an embodiment, the skills data set 504 may include the user's social media activity to show behavioral patterns. "Social media activity", as used herein, is a user's history on content sharing platforms. A user's history may include their browsing patterns, posting patterns, like patterns, and the like. Social media may include Instagram, Facebook, LinkedIn, and the like. In an embodiment, behavioral patterns may be used to determine the aptitudes or abilities of a user 108. Examples of a behavioral pattern may include the user's pecuniary behaviors, past experience and skills, and the like. Pecuniary behaviors may be a subset of a behavioral pattern. As used herein, "pecuniary behaviors" are behaviors relating to money. Pecuniary behaviors may include things like spending and saving habits. In a non-limiting example, a behavioral pattern may include an audit of a user's bank and credit card records. In another non limiting example, a behavioral pattern may include the user's education and professional certifications. Pecuniary behaviors may also include an evaluation of the assets and debts that the user has accumulated. In another nonlimiting example, a behavior pattern may include a user's personality, such as their inclination to procrastinate, their inclination to lead, their inclination to follow, their inclination to be organized, and the like.

Continuing to reference FIG. 5, skills data set 504 may include survey data. As used in the current disclosure, "survey data" is information that is generated from a series of answers to questions by the user 108. The survey data may include responses to a survey given to a user. In another embodiment, the survey data may include responses to a survey given to a third party. A third party may include employers, parents, teachers, or the like that may be able to provide feedback on a user's strengths. The survey data may be presented on a graphical user interface. The survey data may include multiple choice questions and/or free text questions. The survey data may include questions wherein the user 108 rates themselves. The survey may include questions regarding the user's pecuniary literacy, pecuniary history, occupation, educational history, overall health history, behavioral patterns and the like. The survey data may be used to determine strengths of a user. In an embodiment, survey data may include data showing that a user is good at following deadlines and scheduling tasks.

Continuing reference to FIG. 5, skills data set 504 may include completed tasks 120. Completed tasks may give insight into problem solving strategies, critical thinking skills, etc. For instance, completed tasks dealing with reading comprehension or algebra may show how the user approaches problems and problem solving. This information can be useful skills data set 504 which could gauge an endpoint path that focuses on a different learning strategy or learning style.

Continuing reference to FIG. 5, processor 104 classifies the skills data set 108 in order to provide additional information for the skill classifier 128. Skill classifier 128 may use information pertaining to strengths, deficiencies, and other pertinent information about user 108 tasks. As used herein, a "strength" is a beneficial attribute of a user 108. As used herein, a "beneficial attribute" is a desirable quality and/or characteristic. For example, a strength may include confident public speaking, budgeting, math theory, or the like. In an embodiment, a strength classifier 512 may be used to classify a skills data set 504 to a strength category (also referred to as "strength"). A strength classifier 512 may use strength training data 516 to group data. As used herein, "strength training data" is a plurality of data entries that are used to model a classifier to determine strengths. Strength training data 516 may include previously inputted skills data sets and their corresponding classification output. Inputs to the first machine-learning process 508 may include the skills data set 504. Outputs to the first machine-learning process 508 may include a strength 532/strengths. First machine-learning process 508 may be iterative such that outputs of the classification algorithm may be used as future inputs of the algorithm. This may allow the strength classifier 512 to evolve.

Continuing reference to FIG. 5, skills data set 504 may utilize a second machine-learning process 520 to analyze deficiencies. As used herein, "deficiency training data" is a plurality of data entries that are used to model a classifier to determine deficiencies. Deficiency training data 528 may include previously inputted behavioral data sets and their corresponding classification output. Deficiency training data 528 may include deficiencies relevant to an objective. For example, the deficiency training data 528 may include examples such as a deficiency 536 for a user 108 that is a mechanical engineer, as shown in their user data set 540, and has an endpoint path of becoming a cancer researcher, is a biochemistry background. Deficiencies may be relevant to at least a task 116. A user 508 may have a plurality of deficiencies, but second machine-learning model 520 may only identify deficiencies relevant to at least a task 116. Alternatively, deficiency machine-learning model 520 may identify all deficiencies associated with skills data set 504. Outputs to the second machine-learning process 520 may include a deficiency 536. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Strength classifier 512 and deficiency classifier 524 may be consistent with skill classifier 128. Strength classifier 512 may be consistent with deficiency classifier 524.

Figure 6:
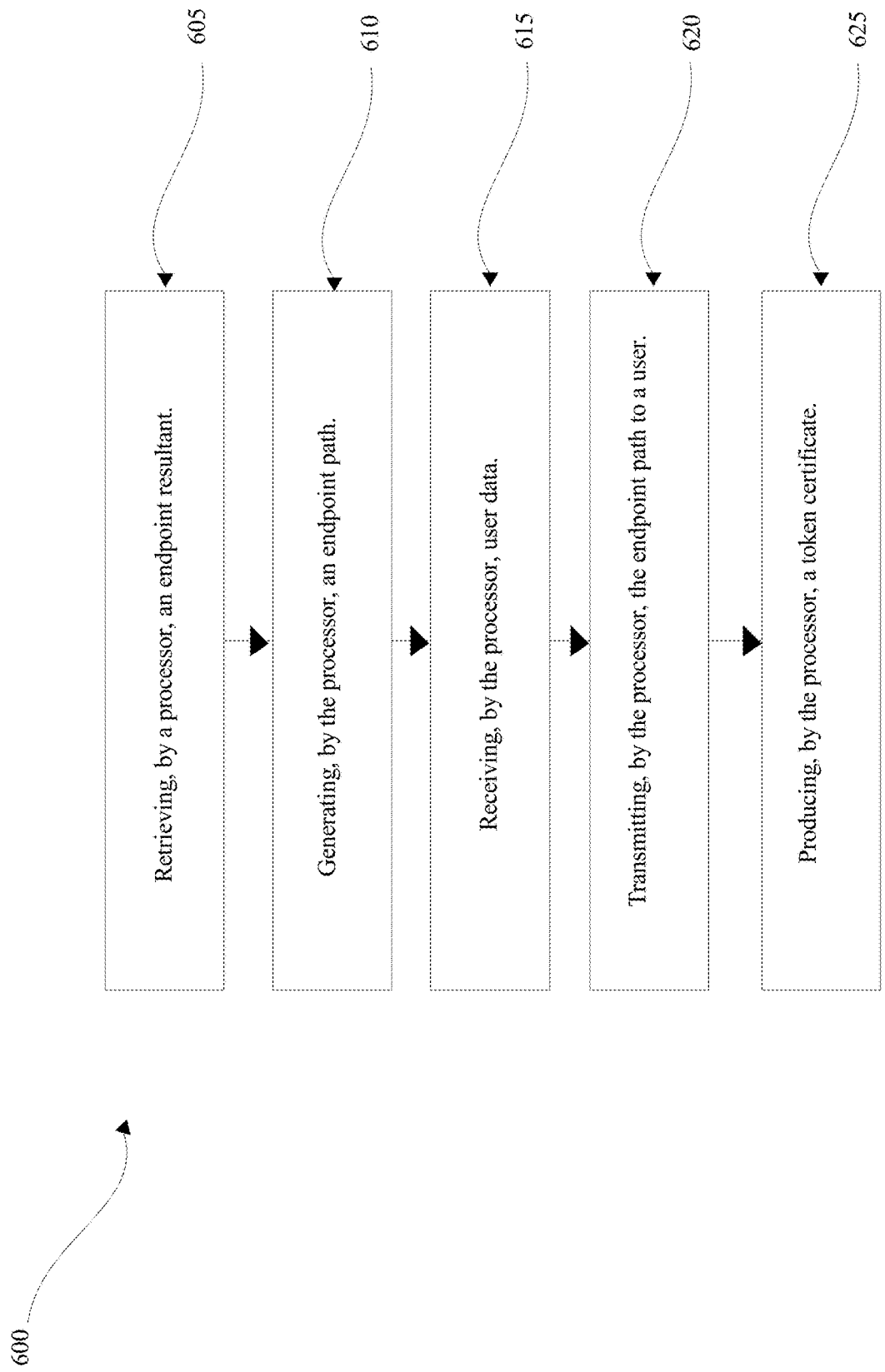
FIG. 6 is a flow diagram illustration a method of generating an endpoint path associated with a user.

Referring now to FIG. 6, a flow diagram of method 600 for generating an endpoint path associated with a user is shown. Step 605 of method 600 include retrieving, by a processor, an endpoint resultant. An endpoint resultant may be determined by user 108. Endpoint resultant may indicate the overall goal that a user wants to complete. This may be implemented as disclosed with references to FIGS. 1-5 above.

Step 610 of method 600 includes generating an endpoint path wherein the endpoint path comprises at least an endpoint. An endpoint may be associated with a completed task and a skill classifier to determine what skills need to be worked on. This may be implemented as disclosed with references to FIGS. 1-5 above.

Step 615 of method 600 includes receiving user data, wherein user data comprises at least a task. User data may be unique for each user. User data may be used within a skill classifier to determine at least what strengths and deficiencies may be relevant to the tasks that a user engages with.

Step 620 of method 600 includes transmitting the endpoint path to a user. Transmitting the endpoint path to a user may include a transmission protocol. This may be implemented as disclosed with references to FIGS. 1-5 above.

Step 625 of method 600 includes generating a token certificate as a function of a completed endpoint. A token certificate may be associated with a completed endpoint. A token certification may also be associated with a completed endpoint path. This may be implemented as disclosed with references to FIGS. 1-5 above.

An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Figure 7:
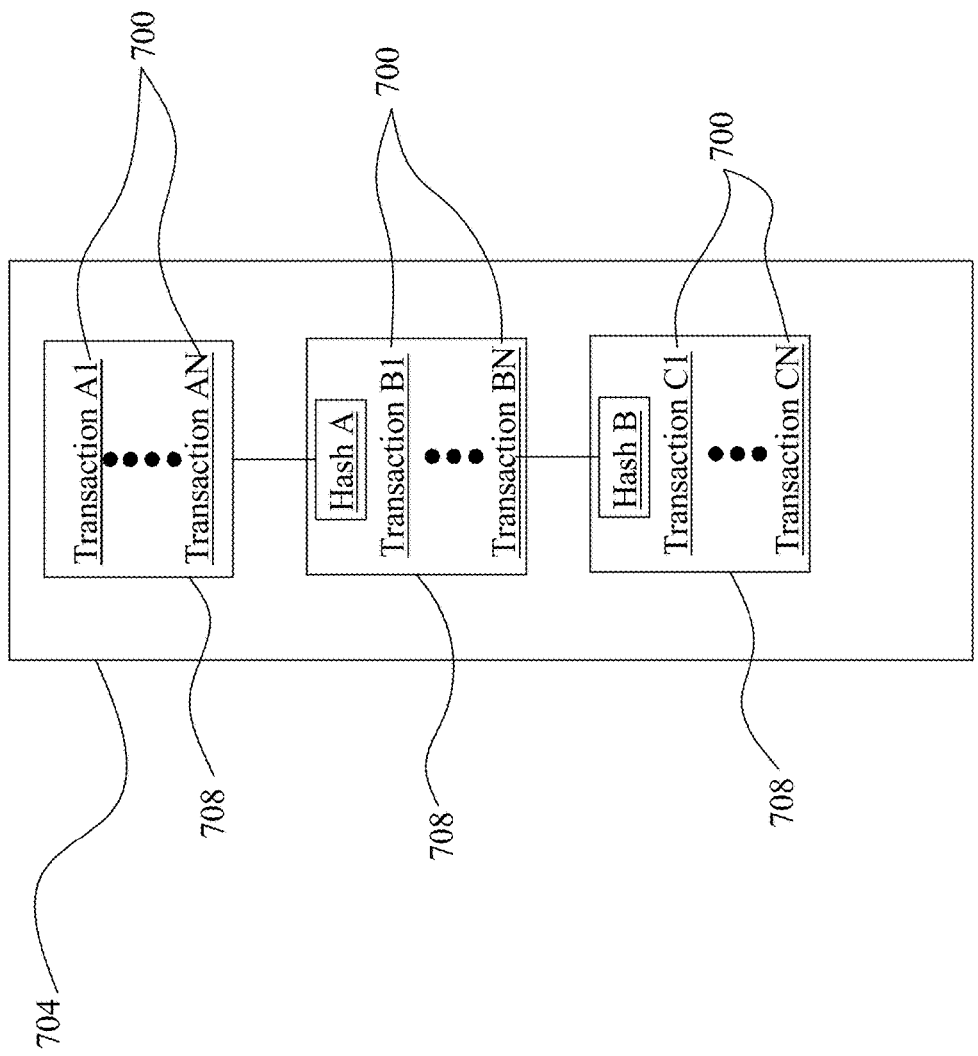
FIG. 7 is a block diagram illustrating an exemplary embodiment of an immutable sequential listing.

Referring now to FIG. 7, an exemplary embodiment of an immutable sequential listing 700 is illustrated. Data elements are listing in immutable sequential listing 700; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 700 may preserve the order in which the at least a posted content took place by listing them in chronological order; alternatively or additionally, immutable sequential listing 700 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 700 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 700 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 2, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
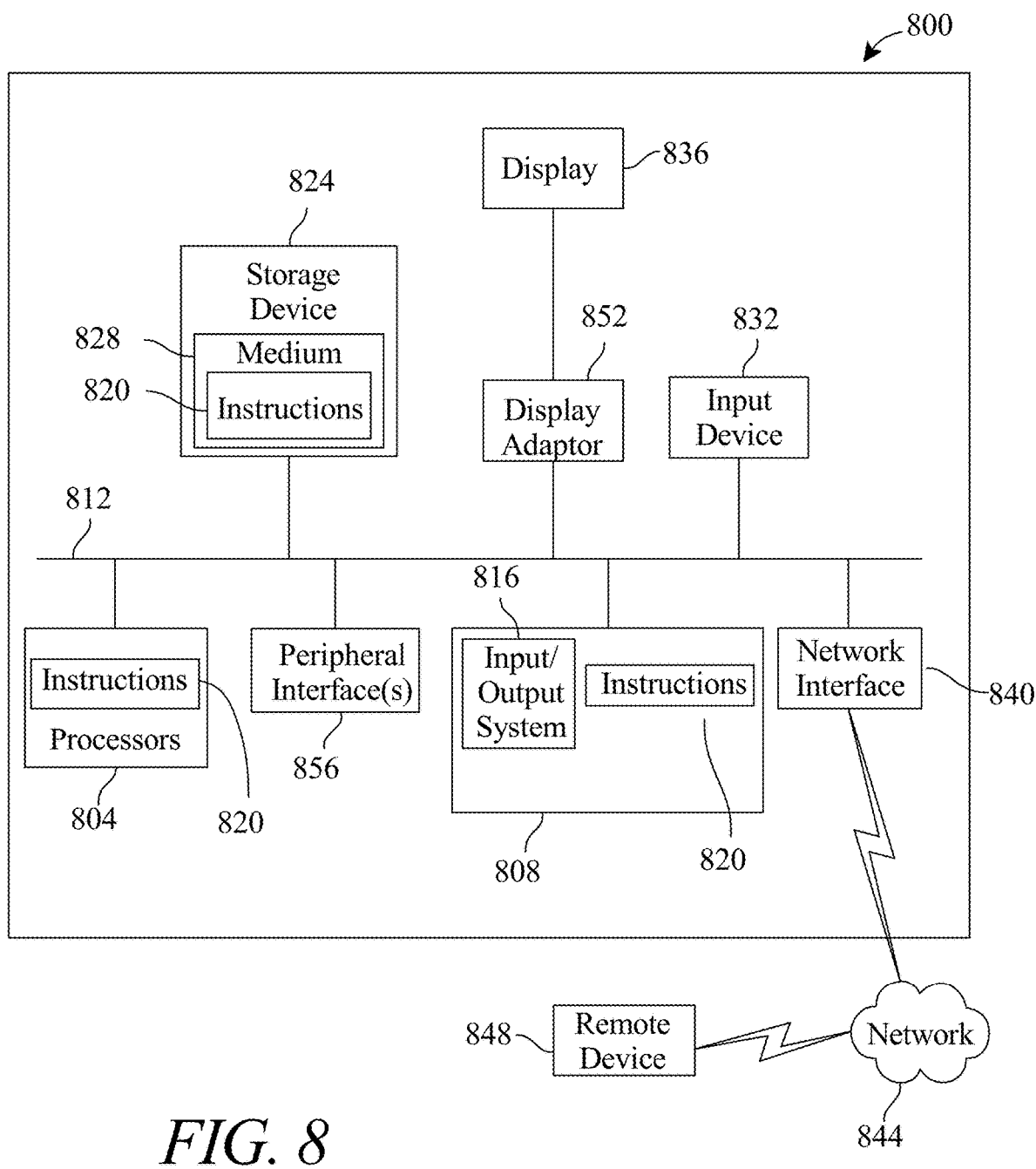
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 862 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 862 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 866. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an endpoint path associated with a user, the apparatus comprising:
   at least a processor; and
   a memory connected to the at least a processor, the memory containing instructions configuring the at least a processor to:
   retrieve an endpoint resultant from a user;
   generate an endpoint path wherein the endpoint path comprises at least an endpoint;
   receive user data, wherein the user data includes a skills data set comprising a deficiency in at least one skill based on a user-submitted skill ranking; and
      wherein the user data indicates performance of at least a task corresponding to the at least an endpoint;
   quantify the deficiency in the at least one skill;
   generate a quantitative measure as a function of the user data, the at least an endpoint, and the quantified deficiency;
   transmit the endpoint path to a user; and
   produce a token certificate as a function of a quantitative measure.

2. The apparatus of claim 1, wherein the memory contains instructions further configuring the at least a processor to:
   transmit user data to a skill classifier;
   utilize a fuzzy set classification function to classify the skill based on the quantified deficiency in the at least one skill;
   generate the at least an endpoint comprising information as a function of the skill classifier.

3. The apparatus of claim 1, wherein receiving the user data further comprises classifying, using a skill classifier, skills of a user based on the skills data set.

4. The apparatus of claim 3, wherein the skills of the user comprises a strength.

5. The apparatus of claim 3, wherein quantifying the deficiency in the at least one skill comprises aggregating a plurality of component scores from a population and weighting the component scores, wherein the weighted component scores are input into a machine learning algorithm trained using data correlating endpoint resultants and endpoint paths.

6. The apparatus of claim 1, wherein at least an endpoint comprises a goal of a user.

7. The apparatus of claim 6, wherein the at least an endpoint comprises user data.

8. The apparatus of claim 1, wherein generating the endpoint path further comprises:
   training a machine-learning model using training data comprising a plurality of inputs containing user data correlated to a plurality of outputs containing tasks;
   retrieving the at least a task by the machine-learning model;
   selecting the endpoint as a function of a skill classifier and a completed task.

9. The apparatus of claim 1, wherein transmitting the endpoint path to a user further comprises:
   receiving the endpoint path;
   transferring the endpoint path to the user using a transmission protocol.

10. The apparatus of claim 1, wherein producing the token certificate further comprises the user completing the endpoint wherein the completed endpoint relates to the user data.

11. A method for generating an endpoint path associated with a user, the method comprising:
   retrieving, by at least a processor, an endpoint resultant from a user;
   generating, by the at least a processor, an endpoint path wherein the endpoint path comprises at least an endpoint;
   receiving, by the at least a processor, user data, wherein the user data includes a skills data set comprising a deficiency in at least one skill based on a user-submitted skill ranking; and
   wherein user data comprises at least a task;
   quantifying the deficiency in the at least one skill;
   transmitting, by the at least a processor, the endpoint path to a user; and
   producing, by the at least a processor, a token certificate as a function of a completed endpoint.

12. The method of claim 11, further comprising:
   transmitting user data to a skill classifier;
   utilizing a fuzzy set classification function to classify the skill based on the quantified deficiency in the at least one skill; and
   generating the at least an endpoint comprising information as a function of the skill classifier.

13. The method of claim 11, wherein receiving user data further comprises classifying, using the skill classifier, skills of a user based on the skills data set.

14. The method of claim 13, wherein the skills of the user comprises a strength.

15. The method of claim 13, wherein quantifying the deficiency in the at least one skill comprises aggregating a plurality of component scores from a population and weighting the component scores, wherein the weighted component scores are input into a machine learning algorithm trained using data correlating endpoint resultants and endpoint paths.

16. The method of claim 11, wherein at least an endpoint comprises a goal of a user.

17. The method of claim 16, wherein the at least an endpoint comprises user data.

18. The method of claim 11, wherein generating the endpoint path further comprises:
   training a machine-learning model using training data comprising a plurality of inputs containing user data correlated to a plurality of outputs containing tasks;
   retrieving the at least a tasks by the machine-learning model;
   selecting the endpoint as a function of a skill classifier and a completed task.

19. The method of claim 11, wherein transmitting the endpoint path to a user further comprises:
   receiving the endpoint path;
   transferring the endpoint path to the user using a transmission protocol.

20. The method of claim 11, wherein producing the token certificate further comprises the user completing the endpoint wherein the completed endpoint relates to the user data.

* * * * *